US012589980B2

(12) United States Patent
Camposagrado et al.

(10) Patent No.: US 12,589,980 B2
(45) Date of Patent: Mar. 31, 2026

(54) HAND TOOL WITH SLIP RESISTANT TIP

(71) Applicant: Milwaukee Electric Tool Corporation, Brookfield, WI (US)

(72) Inventors: Honesto D. Camposagrado, West Allis, WI (US); Clinton L. Cull, Hartland, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 364 days.

(21) Appl. No.: 18/175,733

(22) Filed: Feb. 28, 2023

(65) Prior Publication Data

US 2023/0257244 A1 Aug. 17, 2023

Related U.S. Application Data

(63) Continuation of application No. PCT/US2023/062586, filed on Feb. 14, 2023.

(60) Provisional application No. 63/310,421, filed on Feb. 15, 2022.

(51) Int. Cl.
*B66F 15/00* (2006.01)

(52) U.S. Cl.
CPC .................................... *B66F 15/00* (2013.01)

(58) Field of Classification Search
CPC ........ B66F 15/00; B25B 27/02; B25B 23/106
See application file for complete search history.

(56) References Cited

U.S. PATENT DOCUMENTS 1,741,349 A 12/1929 Sullivan
5,259,277 A 11/1993 Zurbuchen
5,590,868 A * 1/1997 Hebert ..................... B25D 1/04 81/23
6,019,022 A * 2/2000 Dotson ................. B25B 15/007 81/436
6,471,186 B1 * 10/2002 Lawless .................. B25C 11/00 254/25
6,883,405 B2 4/2005 Strauch
D821,842 S 7/2018 Hsu
2003/0088946 A1 5/2003 Ferguson et al.
2003/0196527 A1 10/2003 Strauch
(Continued)

FOREIGN PATENT DOCUMENTS

CN 101332591 9/2010
JP 06-015148 3/1994
(Continued)

OTHER PUBLICATIONS

Milwaukee Tool 4pc Pry Bar Set, https://www.milwaukeetool.com/Products/Hand-Tools/Mechanics-Tools/Picks-and-Pry-Bars/48-22-9214, believed to be commercially available at least by Feb. 28, 2023, Retrieved on Feb. 27, 2023, 12 pages.
(Continued)

*Primary Examiner* — Seahee Hong

(74) *Attorney, Agent, or Firm* — Reinhart Boerner Van Deuren s.c.

(57) ABSTRACT

A tool, such as a pry bar including a textured tip is shown. In one embodiment, the textured tip includes a plurality of projections and a plurality of grooves. Various textured tip embodiments are configured to increase friction/gripping with a workpiece, thereby increasing a pry force applied to the workpiece before the pry bar slips and/or loses contact with the workpiece.

21 Claims, 10 Drawing Sheets

(56) References Cited

U.S. PATENT DOCUMENTS

| | | | | |
|---|---|---|---|---|
| 2004/0149967 | A1* | 8/2004 | Puopolo .................. | B66F 15/00<br>254/25 |
| 2007/0051215 | A1 | 3/2007 | Petillo | |
| 2008/0098860 | A1 | 5/2008 | Hu | |
| 2023/0017379 | A1 | 1/2023 | Nelson et al. | |

FOREIGN PATENT DOCUMENTS

| | | |
|---|---|---|
| JP | 2000167776 | 6/2000 |
| WO | WO2020/163621 | 8/2020 |

OTHER PUBLICATIONS

Wera 334 Screwdriver, https://products.wera.de/en/screwdrivers_kraftform_plus_series_300_334.html, believed to be commercially available at least by Jun. 14, 2021, Retrieved on Sep. 15, 2022, 8 pages.

Wera 350 PH Screwdriver, https://products.wera.de/en/screwdrivers_kraftform_plus_series_300_350_ph.html, believed to be commercially available at least by Jun. 14, 2021, Retrieved on Sep. 15, 2022, 8 pages.

International Search Report and Written Opinion for International Application No. PCT/US2023/062586, dated Jun. 8, 2023, 10 pages.

* cited by examiner

HAND TOOL WITH SLIP RESISTANT TIP

CROSS-REFERENCE TO RELATED PATENT APPLICATIONS

The present application is a continuation of International Application No. PCT/US2023/062586, filed Feb. 14, 2023, which claims the benefit of and priority to U.S. Provisional Application No. 63/310,421 filed on Feb. 15, 2022, which are incorporated herein by reference in their entireties.

BACKGROUND OF THE INVENTION

The present invention relates generally to the field of tools. The present invention relates specifically to a hand tool, pry bar, crow bar, pinch bar, etc., that includes an end or tip that is configured to reduce slipping and/or improve engagement with a workpiece.

SUMMARY OF THE INVENTION

One embodiment of the invention relates to a pry bar including a handle, a shaft, and an engagement end. The shaft is coupled to and extends from the handle along a longitudinal axis of the pry bar. The engagement end extends from the shaft and includes a tip surface and a textured surface section. The textured surface section is positioned on the tip surface. The textured surface section includes a plurality of protrusions and a plurality of grooves. Each protrusion includes a plurality of edges that together define an upper surface of the protrusion. Each groove extends along at least one of the plurality of protrusions. When the textured surface section is engaged with a workpiece, one or more of the plurality of grooves receives a portion of the workpiece such that the grooves resist movement of the workpiece relative to the engagement end during use of the pry bar.

Another embodiment of the invention relates to a pry bar including a handle, a shaft, and a tip. The shaft is coupled to and extends from the handle. The tip extends from the shaft and includes a tip surface, an upper front edge extending along the tip surface, a lower front edge, and a textured surface section. The textured surface section is positioned on the tip surface and includes a protrusion and a groove. The protrusion includes a plurality of edges that together define a raised surface of the protrusion. The groove includes a lowermost point and extends along at least one of the plurality of edges of the protrusion. A height of the tip is defined between the upper front edge and the lower front edge. A height of the protrusion is defined between the raised surface of the protrusion and the lowermost point of the groove. A ratio of the height of the tip to the height of the protrusion is greater than 6.

Another embodiment of the invention relates to a pry bar including a handle, a shaft, and a tip. The shaft is coupled to and extends from the handle along a longitudinal axis of the pry bar. The tip extends from the shaft and includes a tip surface and a textured surface section. The textured surface section is positioned on the tip surface and extends along the longitudinal axis. The textured surface section includes a plurality of protrusions and a groove. Each of the protrusions includes a plurality of edges that together define a raised surface of the protrusion. The groove includes a lowermost point and extends along at least one of the plurality of protrusions. The groove has a depth defined between the raised surface of the protrusion and the lowermost point of the groove and a width defined between opposing edges of adjacent protrusions.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a hand tool, specifically pry bars are shown. Various embodiments of the hand tools discussed herein includes an innovative texture located on a tip or end of the tool. In conventional pry bar designs, the tip or engagement end of the pry bar may move (i.e., slip) relative to a workpiece reducing the effectiveness and force applied by the pry bar. The texture discussed herein is designed to provide for a variety of characteristics, including increased workpiece engagement by reducing the likelihood that the tip of the tool/pry bar slips (e.g., increased coefficient of friction) against the workpiece. Particularly when implemented for a pry bar tool, the tip designs discussed herein are believed to allow the user to apply a greater pry force to the workpiece before the pry bar slips and/or loses contact (e.g., disengages) with the workpiece while providing suitable strength, accessibility, and/or manufacturability of the pry bar.

As will be generally understood, in typical pry bar designs, the shape of the engagement end (e.g., the tip) of the pry bar depends on the desired functionality and/or specific application. A pry bar designed for automotive use typically include a narrow shaft to allow for positioning and alignment of components. Applicant has determined various relevant parameters of the pry bar design, such as pry force, pry pressure etc., can be selected to ensure the operation of the pry bar creates a satisfactory amount of leverage and workpiece engagement. In various pry bar designs discussed herein, the workpiece engagement is a function of a variety of parameters that relate to the force provided such as pry bar length, tip shape, tip angle, shaft cross-section shape, material etc. therefore, for a given set of pry bar mechanical parameters and a given desired leverage, the pry bar needs to be configured to have a given amount of friction with a workpiece in order to apply a given amount of force on the workpiece.

Applicant believes the pry bar and specifically the texture designs discussed herein are a function of a variety of parameters that relate to workpiece engagement including the depth of the grooves, width of the grooves, the area of the raised profile of the texture protrusions and/or projections, the width of the pry bar tip, the height of the pry bar tip, the length of the textured region, the length of the pry bar, the thinnest true cross section of the pry bar, etc. Applicant has developed various innovative textures that provide a desired level of pry force and engagement while maintaining the strength, accessibility (e.g., ability of pry bar tip to reach and engage in small spaces), and/or manufacturability of the pry bar.

Figure 1:
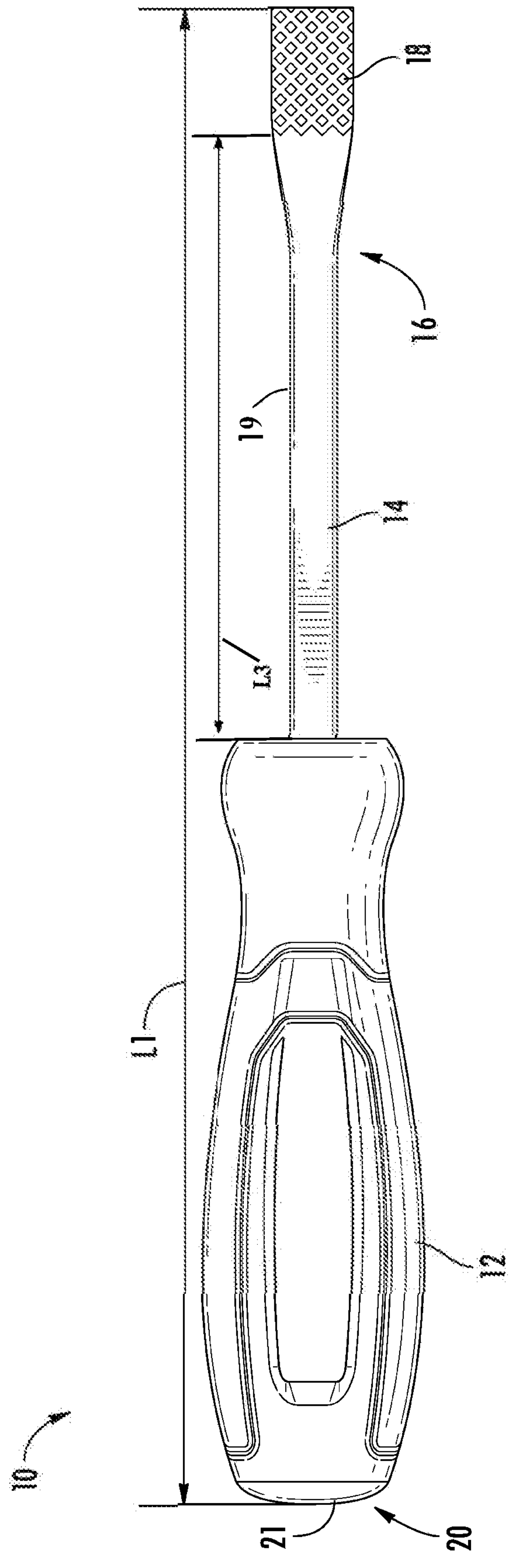
FIG. 1 is a top view of a pry bar, according to an exemplary embodiment.

Referring to FIG. 1, various aspects of a hand tool, shown as a pry bar 10, are shown. In general, pry bar 10 includes a handle 12, a shaft 14, and an engagement end, shown as tip 16. Shaft 14 is coupled to and extends from handle 12 along a longitudinal axis of pry bar 10. As will be generally understood, tip 16 extends from shaft 14 and includes a generally flattened or planar surface that acts as a lever such that an operator can apply a force between objects. In a specific embodiment, tip 16 extends from shaft 14 at an angle. Tip 16 includes a textured surface section 18. Texture surface 18 is textured relative to untextured and/or smooth section 19 of shaft 14. As will be discussed in greater detail below, Applicant has designed a texture to improve the grip (e.g., increase friction) of pry bar 10 on a workpiece while providing suitable strength and/or manufacturability of the pry bar. In other embodiments, the hand tool with a textured surface may be a different tool with a different size and/or shaped engagement end (e.g., claw hammer, wrecking bar, flat bar, claw bar, etc.).

In a specific embodiment, handle 12 includes a strike cap 20. Strike cap 20 is coupled to an end of handle 12 distal from shaft 14. Strike cap 20 is designed (i.e., formed from a material, shaped, etc.) to receive a force from a striking tool such as a hammer, allowing an operator to use pry bar 10 in compact areas without causing damage to handle 12. In various specific embodiments, handle 12 is formed from a first material and strike cap 20 is formed from a second material different than the first material. In a specific embodiment, the second material has a hardness or durometer that is greater than the harness or durometer of the first material. In a specific embodiment, handle 12 is formed from a polymer and strike cap 20 is formed from metal.

Figure 2:
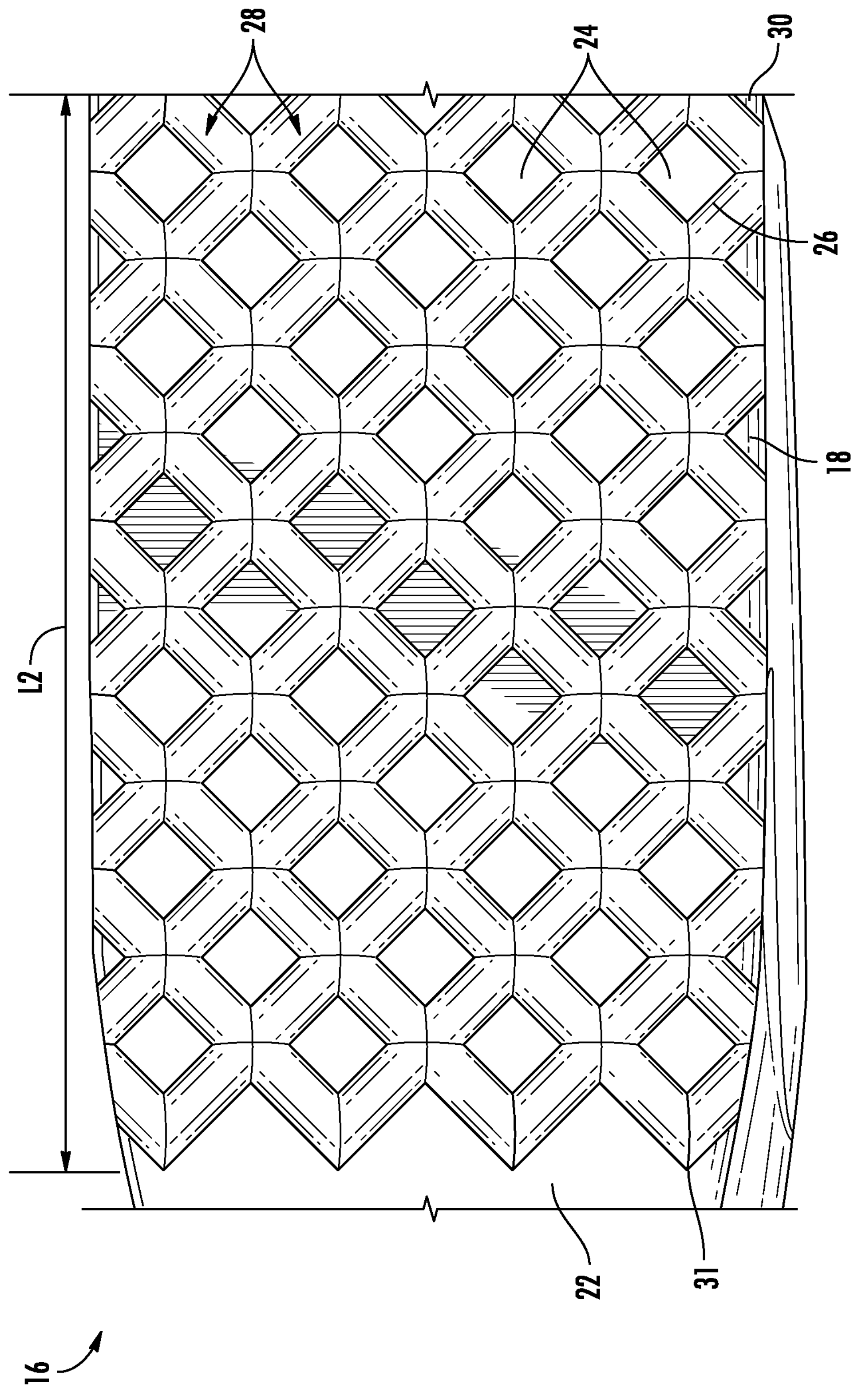
FIG. 2 is a top perspective view of a tip portion of the pry bar of FIG. 1 with a textured surface, according to an exemplary embodiment.

Referring to FIGS. 1-2, pry bar 10 includes a length, L1, defined between the outer surface 21 of strike cap 20 and an upper front edge 30 of tip 16. In other words, length L1 is defined between a distal end of the handle 12 and the upper front edge 30 of tip 16 (i.e., length of pry bar 10 along the longitudinal axis). In a specific embodiment, L1 is about 8 inches (e.g., 8 inches±0.8 inches). In other embodiments L1 may be about 12 inches (e.g., 12 inches±1.2 inches), about 18 inches (e.g., 18 inches±1.8 inches), about 24 inches (e.g., 24 inches±2.4 inches), or greater (e.g., 36 inches, 42 inches etc.).

Untextured section 19 is positioned on is positioned on an upward facing (in the orientation shown in FIGS. 1-2) surface of shaft 14. Untextured surface section 19 extends along the longitudinal axis of pry bar 10. In a specific embodiment, the untextured surface section is included on a downward facing surface of shaft 14 or on both the upward facing surface and downward facing surface of the shaft 14 of pry bar 10.

Referring to FIG. 2, textured surface section 18 is positioned on a tip surface, shown as upward facing (in the orientation shown in FIGS. 1-2) surface 22. Textured surface section 18 extends along the longitudinal axis of pry bar 10. In another embodiment, a textured surface section may be included on a downward facing surface (see e.g., surface 34 of FIG. 4) or on both the upward facing surface and downward facing surface of the pry bar. Textured surface section 18 extends between upper front edge 30 of tip 16 and a rear edge 31 defined by the rearmost point of the texture.

Textured surface section 18 includes a plurality of protrusions or projections 24. Each protrusion 24 includes a plurality of edges 26 on a raised portion of each protrusion 24. The plurality of edges 26 together define a perimeter of the raised portion (e.g., upper surface 38 of FIG. 5) and/or a raised surface 38 of protrusion 24. Textured surface section 18 further includes a plurality of grooves 28. Each groove 28 is positioned adjacent to at least one protrusion 24 and defined between adjacent edges 26 of adjacent protrusions 24. In other words, each groove 28 extends along at least one protrusion 24 or one of the plurality of edges 26 of a protrusion 24.

In various specific embodiments, the upper surface 38 of at least one protrusion 24 includes 4 edges that define upper surface 38. In a specific embodiment, each protrusion 24 includes 4 edges 26. In various specific embodiments, upper surface 38 of at least one protrusion 24 has a quadrilateral shape. In a specific embodiment, the raised or upper surface 38 of each protrusion has a quadrilateral shape. In a specific embodiment, the upper surface 38 of at least one protrusion 24 has a square shape. In another specific embodiment, the raised or upper surface 38 of each protrusion 24 has a square shape. In other embodiments, the raised surface 38 of each protrusion 24 may have a different number of edges (i.e., 3, 5, 6, etc.) and be another shape (e.g., triangular, polygonal, etc.).

In various specific embodiments, the raised upper surface 38 of each whole protrusion 24 has a first shape and the raised upper surface 38 of each partial protrusions 24 positioned adjacent to opposing sides surfaces 36 of tip 16 have a second shape, different than the first shape. In other words, some protrusions 24 positioned along or adjacent to the opposing sides surfaces 36 of tip 16 are partial protrusions (i.e., do not include all edges 26 or full surface area of raised surface 38). Similarly, in various specific embodiments, some protrusions 24 positioned along upper front edge 30 are partial protrusions 24 such that the protrusions have a second shape different than the first shape of the whole protrusions 24. In various specific embodiments, the tip 16 and/or upper surface 22 is sized or dimensioned to include whole protrusions 24.

When a user positions pry bar 10 such that textured surface section 18 is engaged with a workpiece, one or more of the plurality of grooves 28 receives a portion of the workpiece and engages or interfaces against a surface of the workpiece providing a mechanical resistance reducing the slipping or movement of the workpiece relative to tip 16 and/or textured surface section 18. In other words, at least a portion of the workpiece is captured or received within one or more of the plurality of grooves 28 to resist movement (i.e., slipping) of the workpiece relative to the pry bar 10 and specifically tip 16.

In various embodiments discussed herein, a surface structure, such as textured surface section 18 is used to reduce slipping and/or disengagement between pry bar 10 and a workpiece. In such designs the textured surface section provides an increase in friction through an area with a length less than the total length of the tip 16. Applicant has found that such a design provides sufficient increase in friction to reduce potential slipping between the pry bar 10 and a workpiece surface while maintaining manufacturability of the tool. In a specific embodiment, Applicant found an increase in the coefficient of kinetic friction and in the coefficient of static friction. Further, Applicant has found the texture (e.g., the grooves) reduce and/or stop slipping due to mechanical resistance (e.g., portion of workpiece catches in the groove).

Textured surface section 18 includes a length, L2, defined between upper front edge 30 of tip 16 and rear edge 31 of textured surface section 18. In a specific embodiment, pry bar 10 is an 8 inch pry bar having an L1/L2 ratio of between 9 and 14 and specifically about 11.9 (e.g., 11.9±1.2). In a specific embodiment, L2 is between 10 mm and 20 mm, more specifically between 16 mm and 19 mm, and in such embodiments L2 is about 17.62 mm (e.g., 17.62 mm±1.76).

Untextured surface section 19 includes a length, L3 shown defined between a rear or distal end of tip 16 and handle 12. In various specific embodiments, L2 is less than 30% of L3 and more specifically less than 20% of L3.

Figure 3:
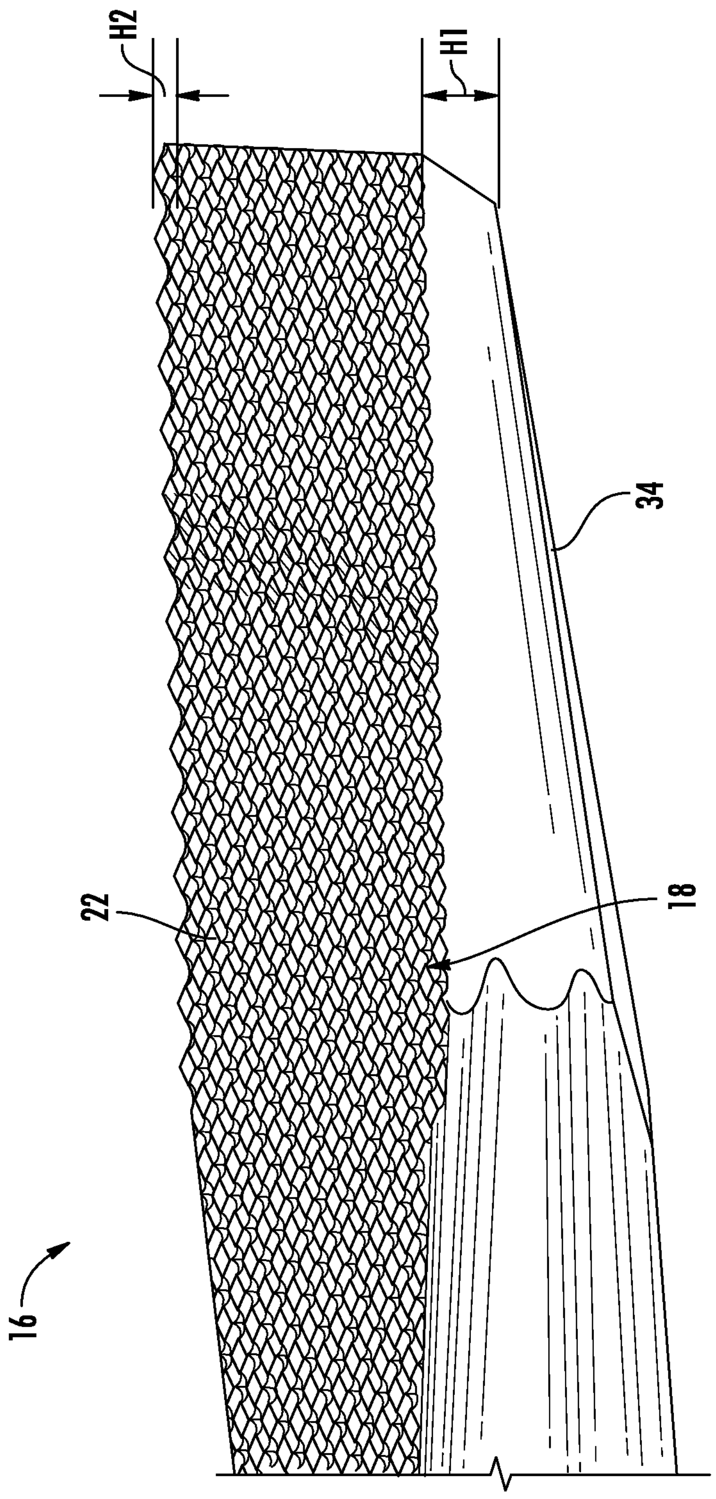
FIG. 3 is a perspective side view of the tip portion of the pry bar of FIG. 1, according to an exemplary embodiment.
Figure 4:
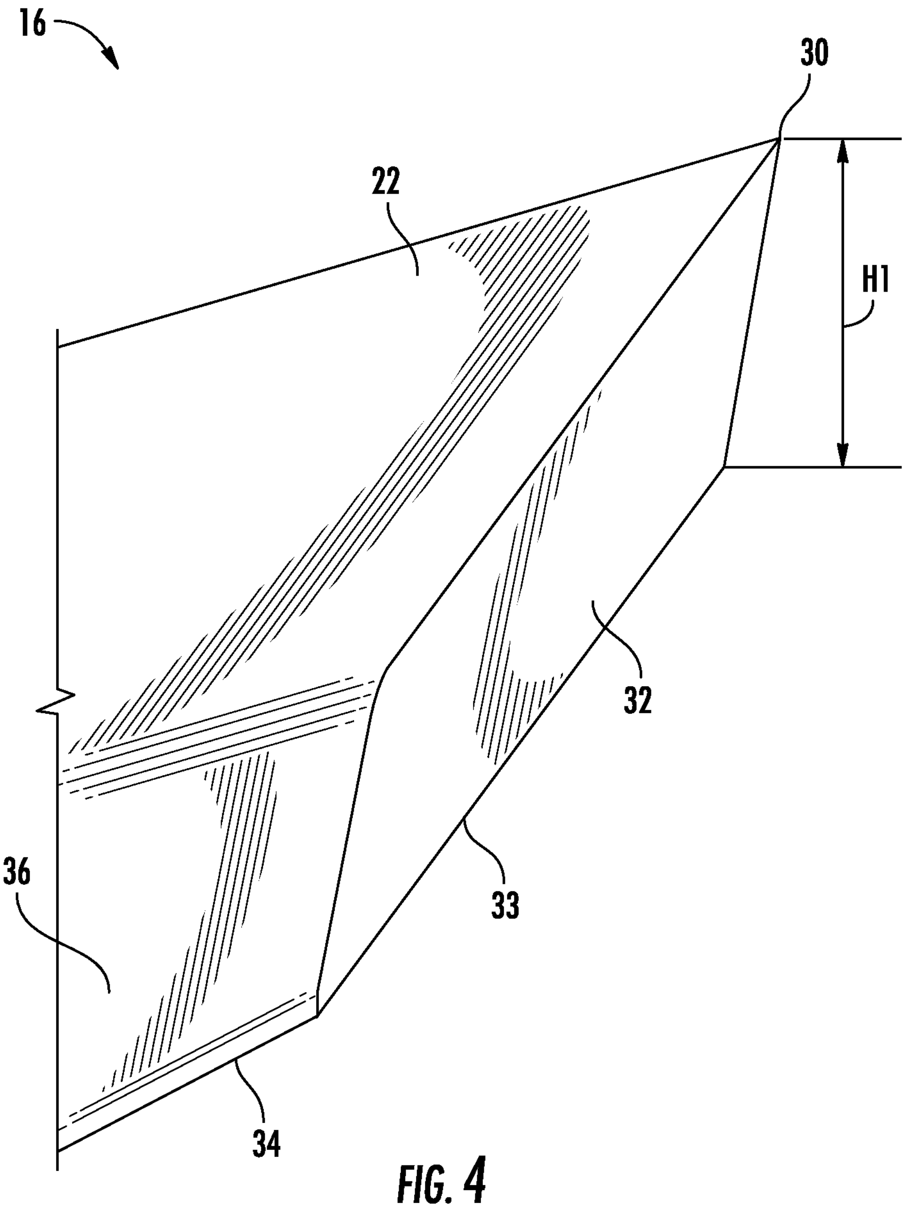
FIG. 4 is a front perspective view of the tip portion of the pry bar of FIG. 1 with the textured surface section removed, according to an exemplary embodiment.
Figure 5:
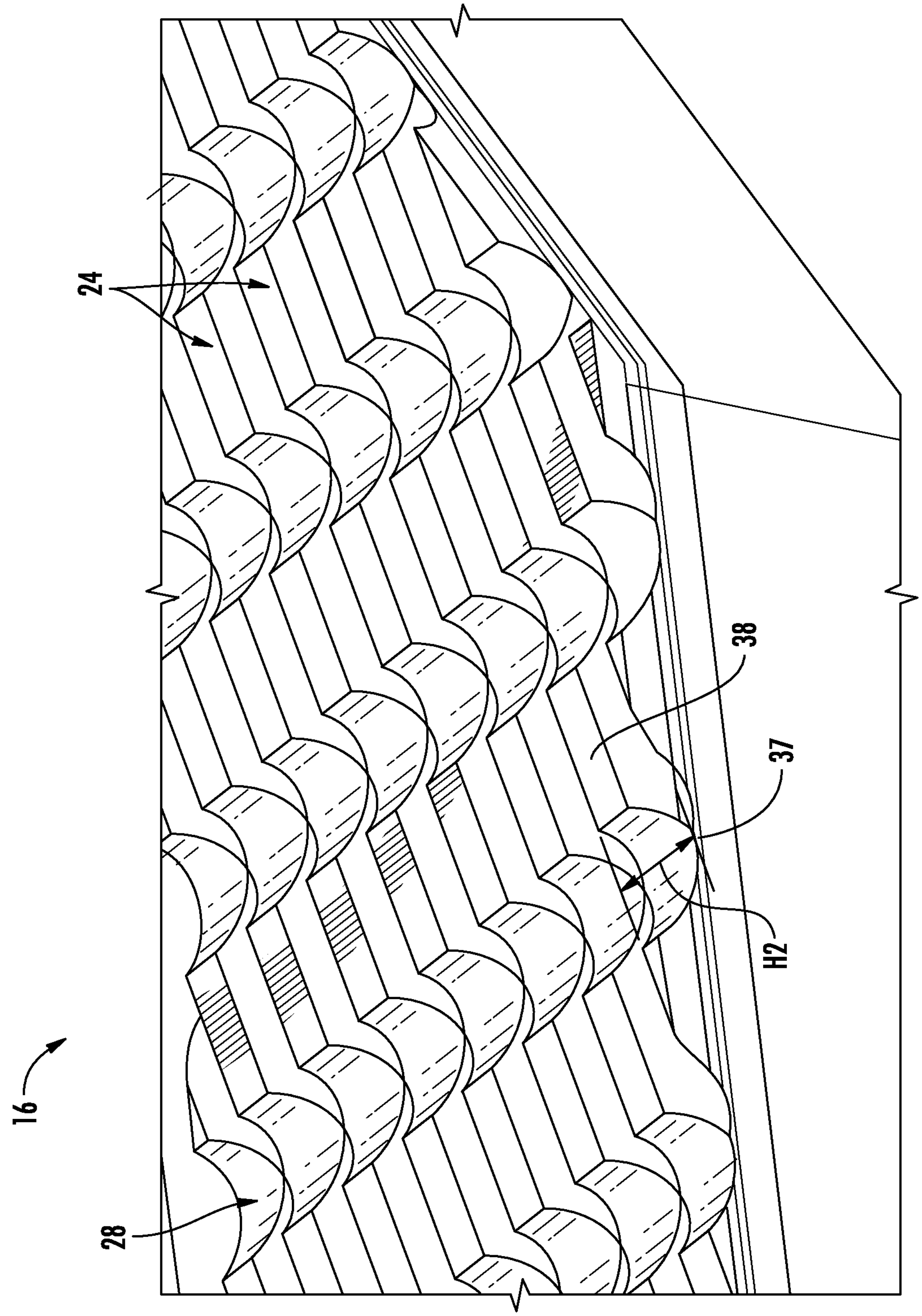
FIG. 5 is a detailed perspective view of the tip portion of the pry bar of FIG. 1, according to an exemplary embodiment.

Referring to FIGS. 3-5, perspective views of the tip 16 are shown according to an exemplary embodiment. Upward facing surface 22 is connected to an angled front surface 32 along upper front edge 30. In other words, upper front edge 30 extends along upward facing surface 22 at a front portion of tip 16. Downward facing surface 34 (in the orientation shown in FIGS. 1-3) is connected to angled front surface 32 along a lower front edge 33. Upward facing surface 22 and downward facing surface 34 slightly converge as they approach angled front surface 32. A pair of opposing side surfaces 36 further connect upward facing surface 22 to downward facing surface 34.

Tip 16 includes two generally planar surface in upward facing surface 22 and downward facing surface 34. A width of the tip 16 (see e.g., W1 in FIG. 6) is greater than a width of shaft 14 of pry bar 10. As will generally be understood, the width and thickness of tip 16 (see e.g., T in FIG. 9) is important because the mass at the engagement end or contact area allows for a desired load capacity. Similarly, the shaft 14 and specifically the tip 16 is formed from a material with a hardness chosen to allow for bending (i.e., lower hardness than material used to form a tip of a tool, such as a fastening tool) rather than only wear resistance.

In various embodiments, the improved grip of pry bar 10 can be evaluated by comparing the relative size of the texturing (e.g., height of protrusion 24 or depth of groove 28) to the size of pry bar 10 (e.g., height at tip 16). A height (the vertical dimension shown in FIGS. 3-4) of tip 16, H1, is defined between upper front edge 30 and lower front edge 33. A height of each protrusion 24 or depth of groove 28, H2 is defined between a lowermost point 37 of groove 28 and an upper surface 38 of protrusion 24. In a specific embodiment, the groove 28 has a curved surface such that lowermost point 37 in a center of groove 28. In other words, the depth of the groove 28 is defined between an edge 26 or upper surface 38 of the protrusion 24 and the lowermost point 37 (i.e., positioned lower that edges 26 or protrusion 24).

In various embodiments, the ratio H1/H2 is greater than 6, is specifically between 9 and 12, and more specifically between 9.5 and 11. In a specific embodiment, the ratio of H1/H2 is about 10.6. In a specific embodiment, pry bar 10 is an 8 inch pry bar in which H1 is about 2.98 mm (e.g., 2.98 mm±0.3 mm). In a specific embodiment, pry bar 10 is a 12 inch pry bar in which H1 is about 3.62 mm (e.g., 3.62 mm±0.36 mm). In a specific embodiment, pry bar 10 is an 18 inch pry bar in which H1 is about 3.62 mm (e.g., 3.62 mm±0.36 mm). In another specific embodiment, pry bar 10 is a 24 inch pry bar in which H1 is about 4.23 mm (e.g., 4.23 mm±0.42 mm). In a specific embodiment, pry bar 10 is a 36 inch pry bar in which H1 is about 4.4 mm (e.g., 4.4 mm±0.44 mm). In a specific embodiment, pry bar 10 is a 42 inch pry bar in which H1 is about 4.4 mm (e.g., 4.4 mm±0.44 mm).

In various embodiments, the improved grip of pry bar 10 and manufacturability can be evaluated by comparing the relative size of the texturing (e.g., height of protrusion 24 or depth of groove 28) or H2 to the length of pry bar, L1. In various embodiments, the ratio H2/L1 is greater than 0.0005, is specifically between 0.001-0.002, and more specifically between 0.001 and 0.0015. In a specific embodiment, pry bar 10 is an 8 inch pry bar in which H2 is about 0.28 mm (e.g., about 0.28 mm±0.056).

Figure 6:
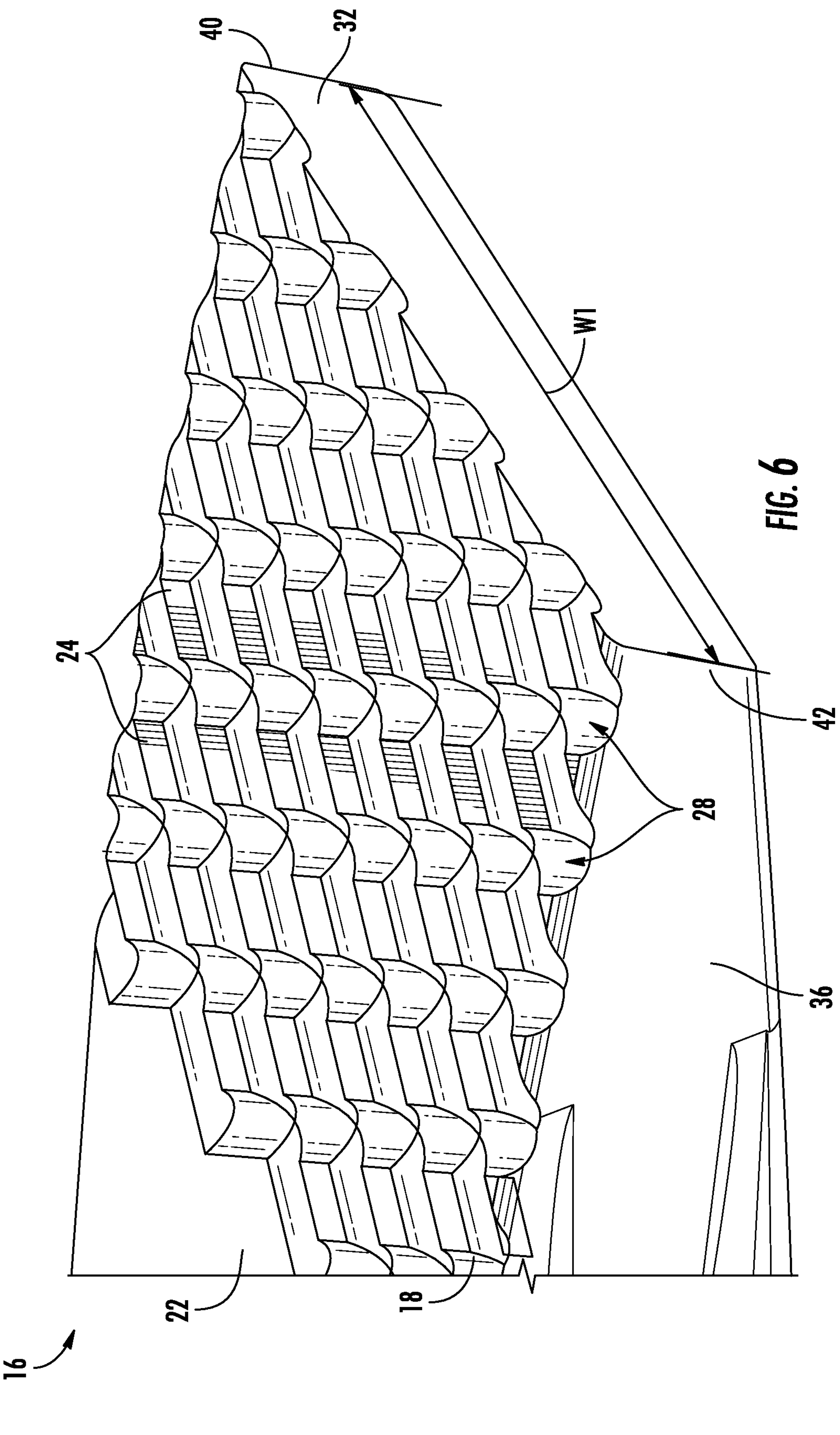
FIG. 6 is a front perspective view of the tip portion of the pry bar of FIG. 1, according to an exemplary embodiment.

Referring to FIG. 6, a perspective view of tip 16 are shown, according to an exemplary embodiment. Angled front surface 32 extends between a first edge 40 connecting one of the opposing side surfaces 36 to angled front surface 32 and a second edge 42 connecting the remaining side surface 36 to angled front surface 32. A width of the tip 16 of pry bar 10, W1, is defined between first edge 40 and second edge 42 of angled front surface 32.

Figure 7:
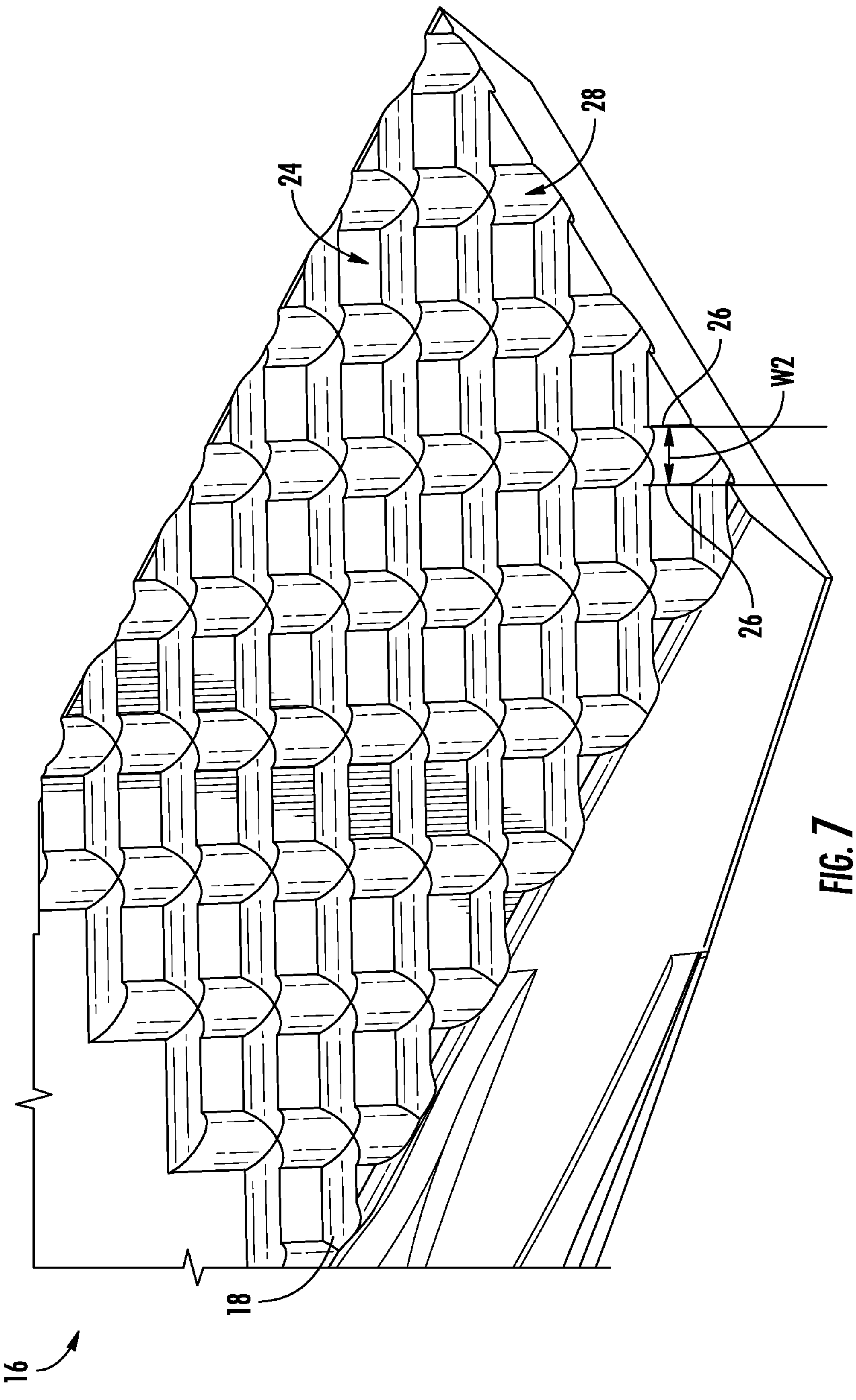
FIG. 7 is a top perspective view of the tip portion of the pry bar of FIG. 1, according to an exemplary embodiment.

Referring to FIG. 7, a perspective view of tip 16 is shown, according to an exemplary embodiment. A width of each groove 28, W2, is defined between opposing edges 26 of the raised surface 38 of adjacent or neighboring protrusions 24. In other words, for a groove 28 positioned between adjacent protrusions 24, the width is defined between the edge 26 of a protrusion 24 that faces an edge 26 of the adjacent protrusion 24 that acts as a boundary of the opposing side of the groove 28. Applicant has found increasing the width of groove 28 may reduce the strength of the textured surface section 18 of the pry bar while decreasing the width of groove 28 may negatively affect manufacturability of the tool.

In various embodiments, the improved grip of pry bar 10 can be evaluated by comparing the relative size of the texturing H2, (e.g., height of protrusion 24 or depth of groove 28) to the width, W2 of groove 28. In various embodiments, W2/H2 (i.e., ratio of the width of groove 28 to depth of groove 28) is greater than 2. In a specific embodiment, W2/H2 is specifically between 2-4, and more specifically between 2.5 and 3.5. In a specific embodiment, the ratio of W2/H2 is about 3.24. In a specific embodiment, W2 or the width of groove 28 is about 0.9165 mm (e.g., 0.9165±0.1).

Figure 8:
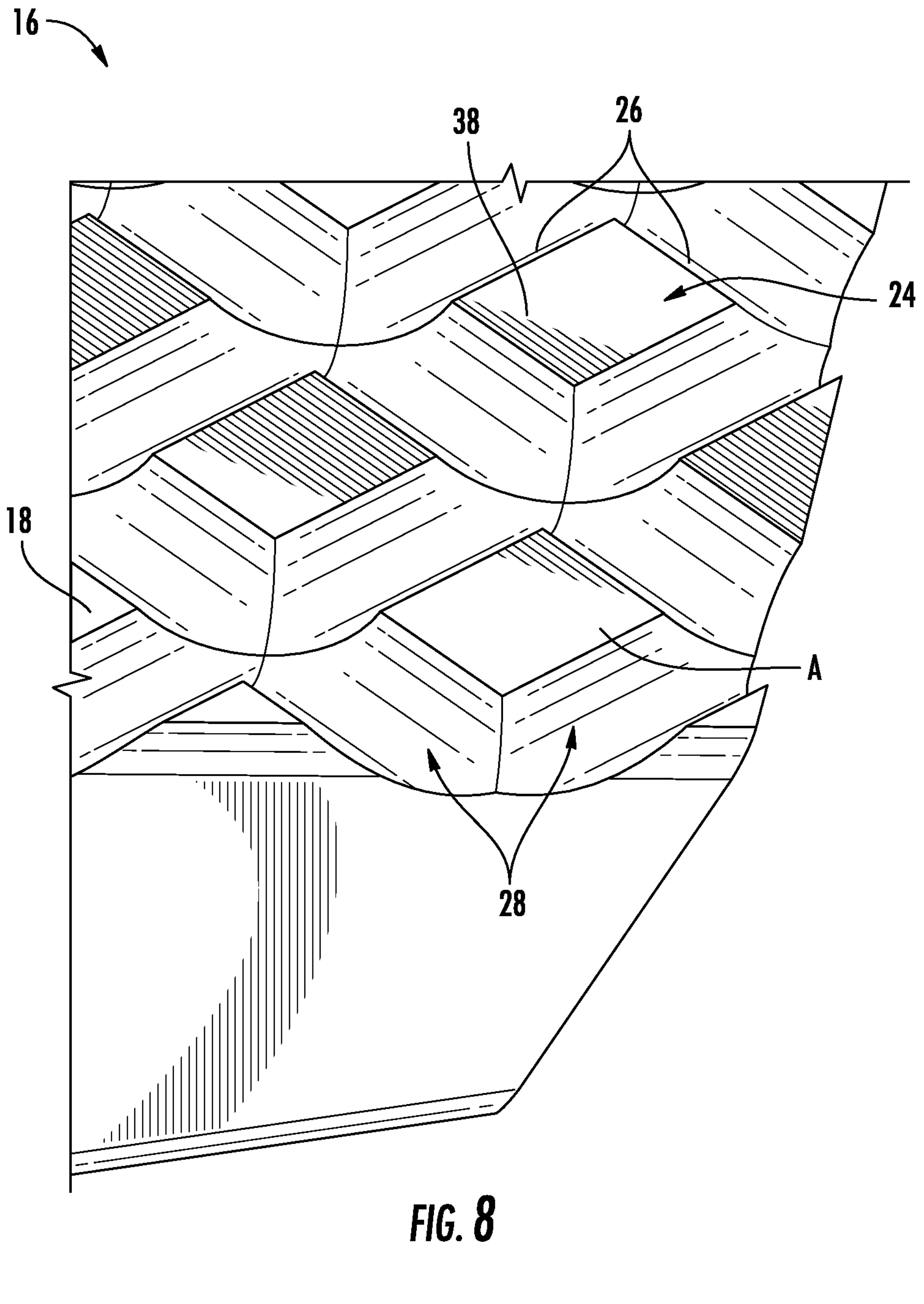
FIG. 8 is a detailed perspective view of the projections on the tip portion of the pry bar of FIG. 1, according to an exemplary embodiment.

Referring to FIG. 8, a detailed perspective view of a section of textured surface section 18 of tip 16 is shown, according to an exemplary embodiment. An area, A, of the upper surface 38 of protrusion 24 is defined between the plurality of edges 26 of each protrusion 24.

In various embodiments, the improved grip of pry bar 10 can be evaluated by comparing the relative size of width, W1 of the pry bar tip to the area, A, of the raised profile of protrusion 24 (e.g., area of upper surface 38 defined by edges 26). Applicant has found that such a design provides sufficient increase in friction to reduce potential slipping between the pry bar 10 and a workpiece surface while maintaining suitable accessibility and strength of the pry bar and also maintaining manufacturability of the tool. Applicant has found decreasing the area negatively affects the performance of the texture while increasing in the area will negatively affect manufacturability of the tool. Further, Applicant has noted increasing the width of pry bar reduces accessibility of the tool, while decreasing the width negatively impacts the strength of the tool.

In various embodiments, the ratio W1/A is greater than 5, is specifically between 5-12, and more specifically between 9 and 10. In a specific embodiment, the ratio of W1/A is about 9.34. In a specific embodiment, W1 is about 10.962 mm (e.g., 10.962 mm±1.1 mm). In a specific embodiment, A is about 1.174 mm (e.g., 1.174 mm±0.12 mm). In such an embodiment, the perimeter, P, of upper surface 38 of protrusion 24 is about 4.334 mm (e.g., 4.334 mm±0.43 mm).

In various embodiments, the improved grip of pry bar 10 can be evaluated by comparing the relative length of the pry bar, L1 to the area, A, of the raised profile of protrusion 24 (e.g., area of upper surface 38 defined by edges 26). Referring to FIGS. 1 and 8, a relative comparison of length L1 and area A can be made, according to an exemplary embodiment.

In various embodiments, the ratio L1/A is greater than 150, is specifically between 150-200, and more specifically between 170 and 180. In a specific embodiment, the ratio of L1/A is about 178.7. In a specific embodiment, L1 is about 209.78 mm (e.g., 209.78 mm±21 mm).

In various embodiments, the improved grip of pry bar 10 can be evaluated by comparing the relative size of the texturing H2 (e.g., height of protrusion 24 or depth of groove 28) to the area, A, of the raised profile of protrusion 24 (e.g., area of upper surface 38 defined by edges 26). Referring to FIGS. 5 and 8, a relative comparison of the depth or height H2 and area A can be made, according to an exemplary embodiment. In various embodiments, the ratio H2/A is greater than 0.1, is specifically between 0.1-1, and more specifically between 0.15 and 0.3. In a specific embodiment, the ratio of H2/A is about 0.241.

Figure 9:
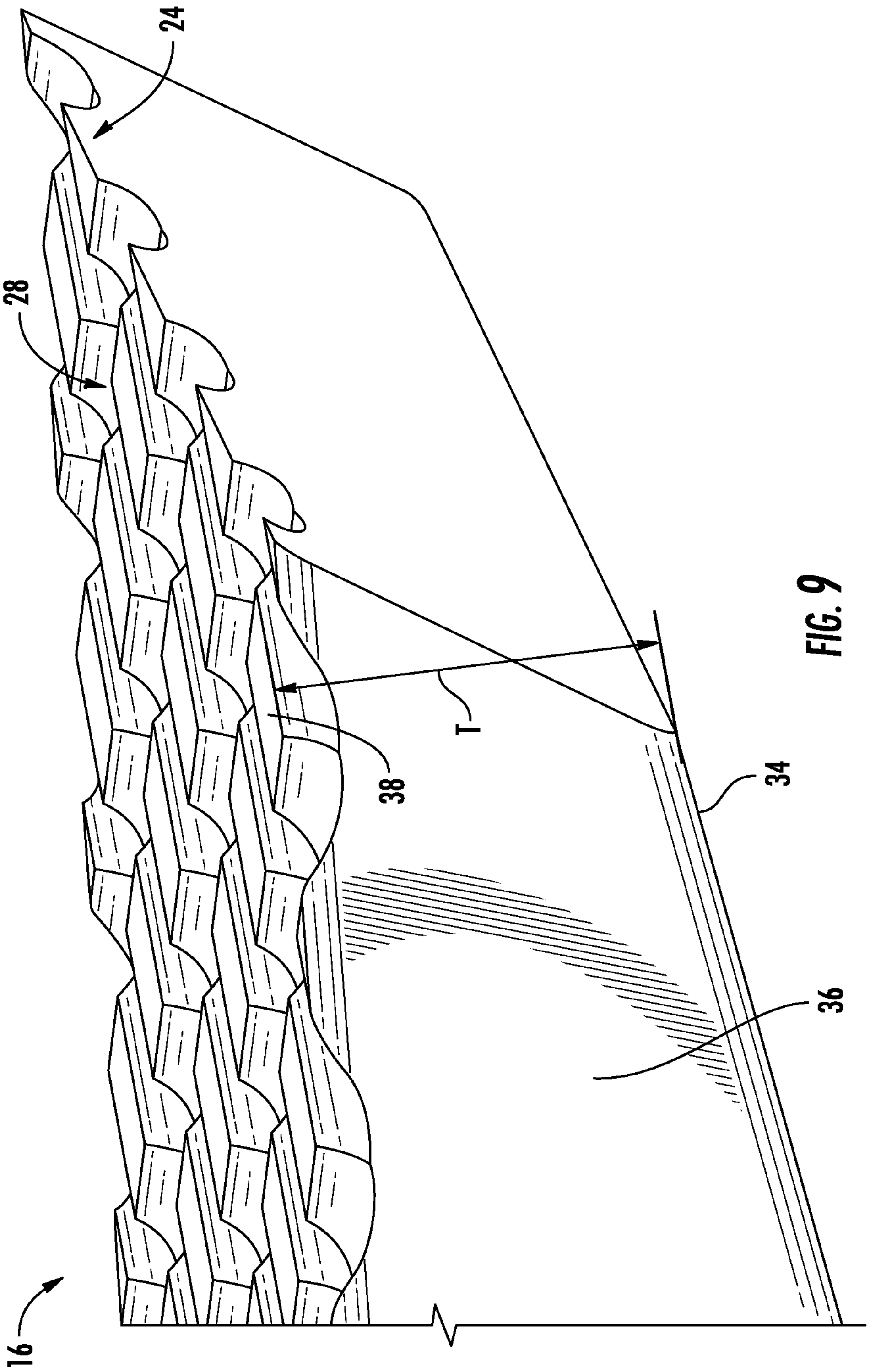
FIG. 9 is a detailed side perspective view of the tip portion of the pry bar of FIG. 1, according to an exemplary embodiment.

Referring to FIG. 9, a detailed side perspective view of the tip portion 16 of the pry bar 10 is shown according to an exemplary embodiment. The thinnest true cross section of pry bar 10, T, is defined between surface 38 of protrusion 24 and downward facing surface 34.

In various embodiments, the improved grip of pry bar 10 can be evaluated by comparing the relative size of the texturing (e.g., height of protrusion 24 or depth of groove 28) to the thinnest true cross section of pry bar 10, shown as T. Applicant has found increasing the cross section of the pry bar reduces accessibility and increases the weight of the tool, while decreasing the cross section of the pry bar reduces the strength of the tool.

In various embodiments, the ratio H2/T is greater than 0.1, is specifically between 0.1-1, and more specifically between 0.1 and 0.2. In a specific embodiment, the ratio of H2/T is about 0.113. In a specific embodiment, T is about 2.502 mm (e.g., 2.502 mm±0.25 mm).

Figure 10:
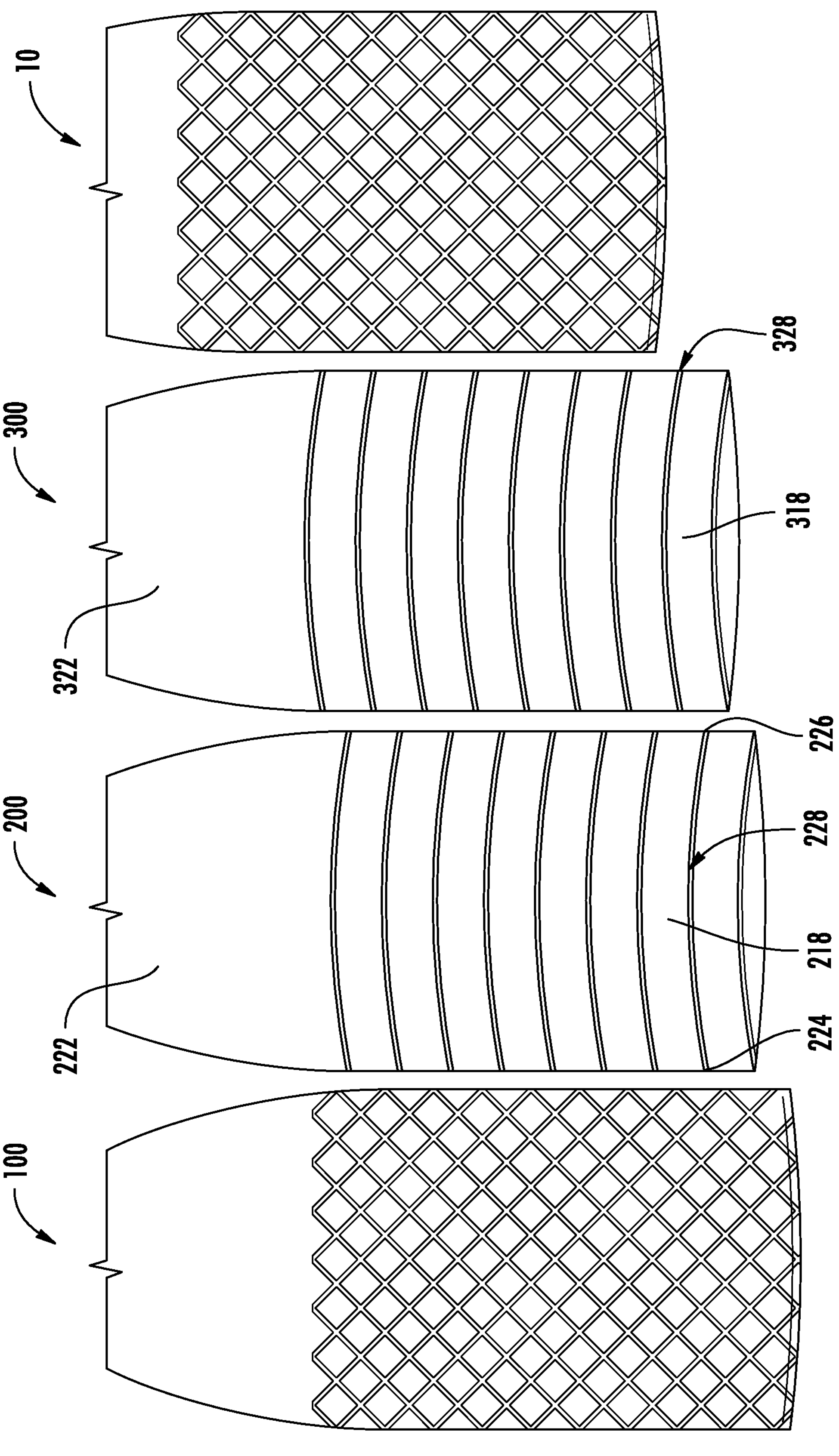
FIG. 10 is a top view of various pry bar tip portions with textured surfaces, according to an exemplary embodiment.

Referring to FIG. 10, a top view of various pry bar textures is shown according to exemplary embodiments. A pry bar 100 is substantially the same as pry bar 10 except for the size of the pry bar. Pry bars 200 and 300 are substantially the same as pry bars 10 and 100 except for the textured surface sections 218 and 318. The textured surface sections

218 and 319 include grooves 228 and 328 that respectively extend across upward facing surfaces 222 and 322 of the pry bars 200, 300 in a generally axial direction (e.g., perpendicular to longitudinal axis of pry bar). In various embodiments, the protrusions and grooves of the textured surface section may have other shapes and sizes of texture design (e.g., grooves extend along longitudinal axis of pry bar, grooves extend in both axial and longitudinal directions, etc.). In a specific embodiment, grooves 228 has a curve such that the middle portion of the groove 228 is positioned behind (e.g., in the orientation shown in FIG. 10) a first end 224 and second end 226 of groove 228. In another embodiment, the groove may be curved such that the middle portion is positioned in front of the first and second end of the groove.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed:

1. A pry bar comprising:
- a handle;
- a shaft coupled to and extending from the handle along a longitudinal axis of the pry bar; and
- an engagement end extending from the shaft, the engagement end comprising:
  - a tip surface; and
  - a textured surface section positioned on the tip surface, the textured surface section comprising:
    - a plurality of protrusions, wherein each protrusion includes a plurality of edges that together define a raised upper surface of the protrusion; and
    - a plurality of grooves, wherein each groove extends along at least one of the plurality of protrusions;
- wherein, when the textured surface section is engaged with a workpiece, one or more of the plurality of grooves receives a portion of the workpiece such that the grooves resist movement of the workpiece relative to the engagement end during use of the pry bar;
- wherein a length of the textured surface section is defined between the upper front edge of the engagement end and a rear edge of the textured surface section; and
- wherein the length of the textured surface section is between 10 mm and 20 mm.

2. The pry bar of claim 1, wherein a length of the pry bar is defined between a distal end of the handle and an upper front edge of the engagement end.

3. The pry bar of claim 2, wherein a ratio of the length of the pry bar to the length of the textured surface section is between 9 and 14.

4. The pry bar of claim 2, wherein the length of the pry bar is 8 inches.

5. The pry bar of claim 1, wherein at least one of the plurality of protrusions includes four edges that define the raised upper surface of the protrusion.

6. The pry bar of claim 5, wherein the raised upper surface of the at least one of the plurality of protrusions has a quadrilateral shape.

7. The pry bar of claim 1, the handle further comprising a strike cap coupled to an end of the handle distal from the shaft.

8. A pry bar comprising:
- a handle;
- a shaft coupled to and extending from the handle; and
- a tip extending from the shaft, the tip comprising:
  - a tip surface;
  - an upper front edge extending along the tip surface;
  - a lower front edge; and
  - a textured surface section positioned on the tip surface, the textured surface section comprising:
    - a protrusion, wherein the protrusion includes a plurality of edges that together define a raised surface of the protrusion; and
    - a groove including a lowermost point, wherein the groove extends along at least one of the plurality of edges of the protrusion;
- wherein a height of the tip is defined between the upper front edge and the lower front edge, and wherein a height of the protrusion is defined between the raised surface of the protrusion and the lowermost point of the groove;
- wherein a ratio of the height of the tip to the height of the protrusion is greater than 6;
- wherein the groove has a depth defined between the raised surface of the protrusion and the lowermost point of the groove and wherein the groove has a width defined between opposing edges of adjacent protrusions; and
- wherein a ratio of the width of the groove to the depth of the groove is greater than 2.

9. The pry bar of claim 8, wherein the ratio of the height of the tip to the height of the protrusion is between 9 and 12.

10. The pry bar of claim 8, wherein the height of the tip is about 2.98 mm.

11. The pry bar of claim 8, wherein a length of the pry bar is defined between a distal end of the handle and the upper front edge of the tip.

12. The pry bar of claim 11, wherein a ratio of the height of the protrusion to the length of the pry bar is greater than 0.0005.

13. The pry bar of claim 11, wherein the ratio of the height of the protrusion to the length of the pry bar is between 0.001 and 0.002.

14. The pry bar of claim 8, wherein the height of the protrusion is about 0.28 mm.

15. A pry bar comprising:
- a handle;
- a shaft coupled to and extending from the handle along a longitudinal axis of the pry bar; and
- a tip extending from the shaft, the tip comprising:
  - a tip surface; and
  - a textured surface section positioned on the tip surface and extending along the longitudinal axis, the textured surface section comprising:
    - a plurality of protrusions, wherein each of the protrusions includes a plurality of edges that together define a raised surface of the protrusion, the raised surface defining an area; and
    - a groove including a lowermost point, wherein the groove extends along at least one of the plurality of protrusions;
- wherein the groove has a depth defined between the raised surface of the protrusion and the lowermost point of the groove and wherein the groove has a width defined between opposing edges of adjacent protrusions;

wherein a width of the tip is defined between opposing edges of the tip, and wherein a ratio of the width of the tip to the area is greater than 5.

16. The pry bar of claim 15, wherein a ratio of the width of the groove to the depth of the groove is greater than 2.

17. The pry bar of claim 15, wherein a ratio of the width of the groove to the depth of the groove is between 2 and 4.

18. The pry bar of claim 15, wherein the width of the groove is about 0.9165 mm.

19. The pry bar of claim 15, wherein at least one of the plurality of protrusions includes 4 edges that define the raised surface.

20. The pry bar of claim 19, wherein the raised surface of the at least one of the plurality of protrusions has a square shape.

21. The pry bar of claim 15, wherein a length of the pry bar is defined between a distal end of the handle and an upper front edge of the tip, and wherein a ratio of the length of the pry bar to the area is greater than 150.

* * * * *